Dec. 18, 1923.  
C. R. KRUEGER  
1,477,832  
SOUND REPRODUCING MACHINE  
Filed April 12, 1922
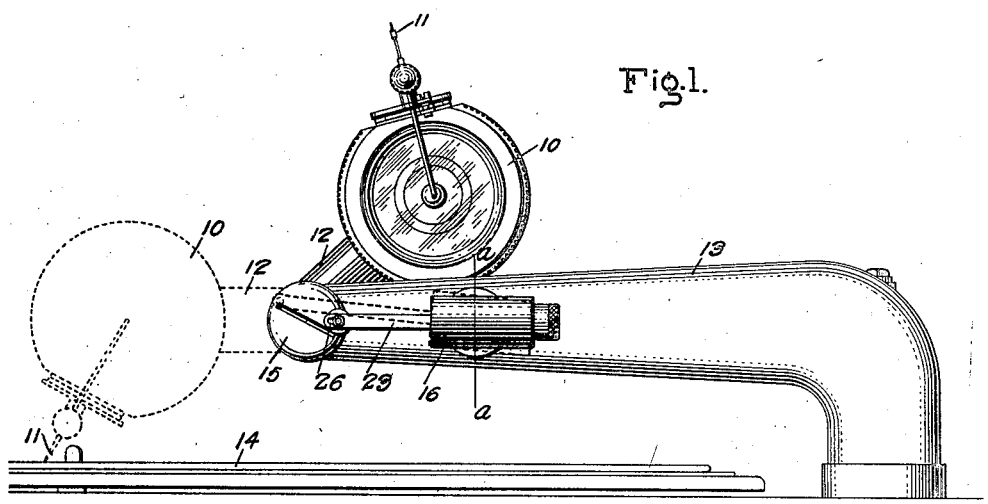
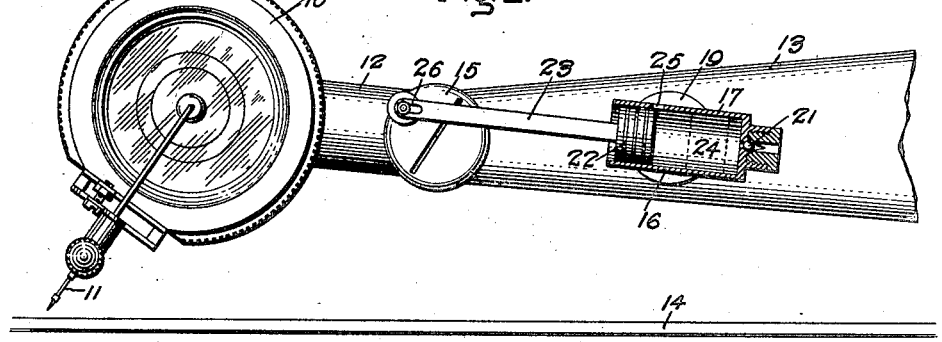
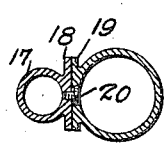
Inventor:  
Carl R. Krueger,  
by *[signature]*  
His Attorney.

Patented Dec. 18, 1923.

1,477,832

UNITED STATES PATENT OFFICE.

CARL R. KRUEGER, OF RENO, NEVADA, ASSIGNOR TO GENERAL ELECTRIC COMPANY, A CORPORATION OF NEW YORK.

SOUND-REPRODUCING MACHINE.

Application filed April 12, 1922. Serial No. 551,880.

*To all whom it may concern:*

Be it known that I, CARL R. KRUEGER, a citizen of the United States, residing at Reno, in the county of Washoe, State of Nevada, have invented certain new and useful Improvements in Sound-Reproducing Machines, of which the following is a specification.

My invention has reference to improvements in sound reproducing machines. More specifically it relates to a device for controlling the movement of the sound box or reproducer to the sound record.

In sound reproducing machines, the sound box or reproducer, which primarily consists of a diaphragm and a needle in vibratory relation therewith, is suitably connected to an amplifying system, which usually consists of one or a number of sound horns. The sound box is arranged to be moved to bring its needle into engagement with the sound record groove. This movement is usually accomplished by pivotally connecting the sound box to the sound horn, and manually lowering and raising the sound box to engage and disengage the needle with the sound record. The needle is an exceedingly delicate instrument, particularly the new types of tungsten needles, and unless the sound box is moved with care, the needle is likely to be broken and the sound box and the record damaged. In using these machines, the sound box is frequently permitted to fall on the record, either by accident or due to carelessness of the operator with the resultant damages above indicated. In order to overcome these difficulties, I provide a device to retard the downward movement of the sound box to the record, and in the preferred form of my invention, employ a dash-pot mechanism for this purpose.

My invention will be better understood from the following description taken in connection with the accompanying drawings and its scope will be pointed out in the appended claim.

In the accompanying drawings,

Fig. 1 is an elevation illustrating a record, a sound box in its inoperative position, and a portion of the sound amplifying system, embodying my invention, the sound box being also shown in operative position in dotted lines; Fig. 2 is an enlarged detail view of Fig. 1, partly in section, with the sound box shown in one position of its path of movement toward the record; and Fig. 3 is a section taken on the line *a—a* of Fig. 1.

Referring to the drawings, the numeral 10 indicates a sound box or reproducer, of any well known or suitable construction, having a needle 11 suitably connected with the diaphragm. The sound box is connected to and communicates with the outer end of a short tube 12, the inner end of which is pivotally conected to and communicates with the smaller end of a tubular tapering sound box arm 13, which in turn communicates with any suitable amplifier, not shown. The arm 13 is arranged to support the sound box 10 above the record tablet 14. The sound box 10 is arranged to swing with respect to said arm about a horizontal axis, occupying the position shown in full lines in Fig. 1, when not in use, and the position shown in dotted lines, in the same figure, when in use. The tube 12 carries at its inner end a disc 15, which is partially rotated by the swinging movement of the sound box. The parts thus far described are a standard construction and form no part of my invention.

In carrying out my invention, I provide means to automatically control the swinging movement of the sound box 10. For this purpose, I may employ any suitable dampening or retarding device; however, I preferably employ a dash-pot, indicated by the numeral 16. The dash-pot is formed with a cylinder 17, having an external flat surface 18 on one side, shown in Fig. 3, to serve as a seat for the cylinder. The arm 13 is formed with a similar external flat surface 19, against which the surface 18 is pivotally held by a screw 20, shown in Fig. 3. At its closed end the cylinder 17 is provided with a standard type of outwardly opening ball valve. A piston 22 is fitted in the cylinder, and is secured to one end of a pitman 23. The opposite end of this pitman is eccentrically connected to the disc 15. By this arrangement the piston is operated by the swinging movement of the sound box 10. When the sound box is in its inoperative position, that is, elevated as shown in full lines in Fig. 1, the piston is nearest the closed end of the cylinder 17, as indicated in dotted lines at 24 in Fig. 2. As the sound box is lowered toward the record, the piston moves outwardly, but very gradually, since the ball valve 21 is closed, thus preventing the rapid falling of the sound box to the record. However, when the sound box has reached a position in which the needle is almost touching the record as shown in Fig. 2, the sound box is relieved of the dampening action of the dash-pot 16, a small opening 25, suitably located in the wall of cylinder 17 being provided for this purpose. The dampening action of the dash-pot 17 is effective until the needle has reached a point from which its drop to the record would cause no injury and at this point it is freed of said action in order that the needle may freely take its place on the record. The record tablet is generally somewhat warped so that it rises and falls slightly underneath the needle and the latter together with the sound box, has to yield easily to this up and down movement. For this purpose, the pitman 23 is slightly slotted at its outer end at 26 and is loosely connected to the disc 15 by a pin. From its operative position, the sound box may be readily raised to its inoperative position, since the ball valve 21 is opened by the backward stroke of the dash-pot piston.

While I have described my invention as embodied in concrete form in accordance with the provisions of the patent statutes, it should be understood that I do not limit my invention thereto, since various modifications thereof will suggest themselves to those skilled in the art without departing from the spirit of my invention, the scope of which is set forth in the annexed claim.

What I claim as new and desire to secure by Letters Patent of the United States, is:—

In a sound reproducing machine, a record tablet, a sound arm, a sound box pivotally secured to said arm, and means for retarding the movement of the sound box toward the record tablet, said means comprising a dash-pot, said dash-pot provided with a port for increasing the intake of the dash-pot when the sound box approaches the table, to relieve the sound box from the retarding effect of the dash-pot.

In witness whereof, I have hereunto set my hand this 5th day of April, 1922.

CARL R. KRUEGER.